United States Patent Office 3,591,438
Patented July 6, 1971

3,591,438
POLYMERIZABLE ACRYLATE COMPOSITION AND CURING ACCELERATOR THEREFOR
Alex S. Toback, West Hartford, and John T. O'Connor, New Haven, Conn., assignors to Loctite Corporation, Newington, Conn.
No Drawing. Filed Mar. 4, 1968, Ser. No. 709,947
Int. Cl. B32b 7/10; C08f 15/06; C09j 5/04
U.S. Cl. 156—310
22 Claims

ABSTRACT OF THE DISCLOSURE

The speed of cure of a peroxy initiated acrylate based adhesive or sealant composition is markedly increased by treating one or more of the surfaces to be bonded with a bonding accelerator containing (a) the condensation product of an aldehyde and a primary or secondary amine and (b) as a reducing activator, either (1) a sulfur-containing free radical accelerator or (2) a compound containing an oxidizable transition metal.

BACKGROUND OF THE INVENTION

It is well recognized that the adhesive bonding of surfaces has a number of inherent advantages over the more traditional mechanical methods of joining, such as by clamps, nuts and bolts, etc. As used herein, "adhesive bonding" refers not only to joining by strong adhesive bonds, but also to sealing or locking operations (such as "thread-locking" of nuts and bolts) wherein adhesive bonds of relatively low strength are adequate. One of the most important reasons adhesives have not made more sizable inroads into industrial bonding applications is their lack of speed in curing, especially at room temperature. This is particularly true in manufacturing operations where it is not convenient to apply adhesives to parts and store them for long periods of time to allow the adhesives to cure in the conventional manner, especially when alignment is important and the parts must be maintained in a specific position or configuration until adequate curing of the adhesive has taken place.

One class of adhesives which, if the speed of cure were increased, could be adapted more readily to the solution of a wide variety of industrial problems is the class of polymerizable acrylate based adhesives. The polymerization (cure) of these adhesives can be initiated by certain free radical generators, most commonly peroxy type polymerization initiators. Many types of desirable acrylate adhesives can be prepared because of the wide variety of viscosity and cure characteristics available in the acrylate monomers, and flexibility, tensile strength and heat resistance characteristics available in the cured products. A particularly useful class of acrylate adhesives is the "anaerobic" class of adhesives, i.e., those which are stabilized by the presence of oxygen but cure when placed in an oxygen free atmosphere, such as between non-porous surfaces.

In the prior art there are known a number of polymerization accelerators which can be used to increase the rate of cure of unsaturated monomers. However, a fully acceptable bonding accelerator has not been available for acrylate based adhesive compositions, particularly one which could provide adequate acceleration when applied as a "primer" or "surface activator" to one or both of the surfaces to be bonded (vis-a-vis mixed with the adhesive at the time of use in the conventional two-part adhesive fashion). The reasons are not fully clear; but in addition to lack of the native accelerating ability, most polymerization accelerators are not suitable bonding accelerators because they have either an adverse effect on the strength of the adhesive bonds which are formed, or because they are incompatible with the adhesive formulation. The compatibility consideration is particularly important when dealing with primers since little or no mixing is available under these conditions of use. Certainly there are other factors involved but, because of the complexity of the reactants and reaction mechanisms, they are not clearly understood at this time.

Another important factor to consider with regard to bonding accelerators is the nature of the surfaces to be bonded. Frequently a bonding accelerator which is quite active on one surface may be considerably less effective—or totally ineffective—on another. Again, the contributing factors to this condition are not fully known. It is suspected that some bonding accelerators have more tendency to penetrate certain surfaces (such as wood) and thus lose their effectiveness. It is further suspected that some surfaces tend to activate or deactivate certain classes of bonding accelerators.

An adhesive system capable of rapid bonding of parts would be a major improvement in the area of adhesive bonding. Further, a bonding accelerator which is capable of markedly increasing the activity of surfaces for adhesive bonding, or of markedly increasing the rate of bonding of an acrylate based adhesive, would be a novel and useful product. In addition, a bonding accelerator which was effective on all or nearly all surfaces would be a novel and useful product.

THE INVENTION

This invention deals with a "primer" for activating surfaces for adhesive bonding. Specifically, the primers contain a mixture of (1) a condensation reaction product of an aldehyde and a primary or secondary amine; and (2) a reducing activator. Generally, the reducing activator is either (a) a sulfur-containing free radical accelerator or (b) a compound containing an oxidizable transition metal. The invention also deals with an adhesive composition comprising: (A) a polymerizable acrylate ester monomer; (B) a peroxy polymerization initiator; and (C) an organic bonding accelerator containing a mixture of (1) a condensation reaction product of an aldehyde and a primary or secondary amine; and (2) as a reducing activator, either (a) a sulfur-containing free radical accelerator or (b) a compound containing an oxidizable transition metal.

This invention also includes a multi-part adhesive system which comprises: (A) as a polymerizable adhesive composition, a mixture of a polymerizable acrylate ester monomer and a peroxy polymerization initiator; and (B) as a bonding accelerator, a mixture of (1) a condensation reaction product of an aldehyde and a primary or secondary amine; and (2) a reducing activator selected from the group consisting of (a) a sulfur-containing free radical accelerator and (b) a compound containing an oxidizable transition metal.

An additional aspect of this invention concerns the process for bonding surfaces which comprises: (A) applying to at least one of such surfaces an organic bonding accelerator containing a mixture of (1) a condensation reaction product of an aldehyde and a primary or secondary amine; and (2) as a reducing activator, either (a) a sulfur-containing free radical accelerator or (b) a compound containing an oxidizable transition metal; and (B) applying to at least one of such surfaces an adhesive composition comprising a mixture of a polymerizable acrylate ester monomer and a peroxy polymerization initiator and (C) placing the surfaces so treated in abutting relation until the adhesive composition polymerizes and bonds the surfaces together.

DISCUSSION OF THE INVENTION AND ITS PREFERRED EMBODIMENTS

The bonding accelerators used in the invention disclosed herein have been found to increase remarkably the activity of surfaces for adhesive bonding and particularly for increasing the speed of cure of free radical initiated acrylate adhesive systems when used in bonding operations. No other material or mixture of materials has been found to produce bonding accelerators capable of achieving comparable results. Further, no other bonding accelerator has been found which is capable of activating a wide variety of surfaces for bonding with acrylate type adhesives in a manner comparable to the bonding accelerators of this invention.

The adhesives contemplated for use in the invention disclosed herein are adhesives of the acrylate ester type. Preferably, these acrylate adhesives are of the anaerobic type, i.e., acrylate monomers admixed with a peroxy initiator to form adhesives which remain stable in the presence of air (oxygen), but which when removed from the presence of air or oxygen will polymerize to form hard, durable resins. This type of adhesive is particularly adaptable to the bonding of metals and other non-porous or non-air permeable materials since these materials effectively exclude air and oxygen from contact with the adhesive. Since these adhesives are stable for long periods of time but do not require the addition of an initiator at the time of intended use, they are exceptionally desirable products. In combination with the bonding accelerators disclosed herein as surface activators, an adhesive system is presented which offers the maximum of convenience and utility. No mixing is necessary to activate the adhesive, but exceptional speed is conveniently produced by use of the surface activator. Naturally, if the convenience of the single component anaerobic adhesives is not essential, any peroxy initiator can be mixed with the acrylate monomer at the time of use without deviating from the broad scope of this invention.

Of particular utility as adhesive materials are polymerizable di- and other polyacrylate esters since, because of their ability to form cross-linked polymers, they have more highly desirable adhesive properties. However, monoacrylate esters can be used, particularly if the non-acrylate portion of the ester contains a hydroxy or amino group, or other reactive substituent which serves as a site for potential cross-linking. Examples of suitable monoacrylate ester monomers are furfuryl methacrylate, cyclohexyl acrylate, isobutyl methacrylate, hydroxyethyl methacrylate, cyanoethyl acrylate, t-butylaminoethyl methacrylate, dimethylaminoethyl methacrylate and glycidal methacrylate. Anaerobic properties (if such are desired) are imparted to the acrylate ester monomers by combining with them a peroxy polymerization initiator as discussed more fully below.

One of the most preferable groups of polyacrylate esters which can be used in the adhesives disclosed herein are polyacrylate esters which have the following general formula:

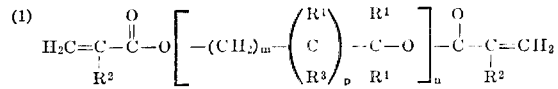

wherein $R^1$ represents a radical selected from the group of hydrogen, lower alkyl of from 1 to about 4 carbon atoms, hydroxy alkyl of from 1 to about 4 carbon atoms, and

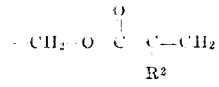

$R^2$ is a radical selected from the group consisting of hydrogen, halogen, and lower alkyl of from 1 to about 4 carbon atoms; $R^3$ is a radical selected from the group consisting of hydrogen, hydroxyl, and

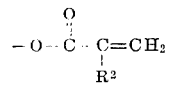

$m$ is an integer equal to at least 1, e.g., from 1 to about 15 or higher, and preferably from 1 to about 8 inclusive; $n$ is an integer equal to at least 1, e.g., 1 to about 20 or more; and $p$ is one of the following: 0, 1.

The polymerizable polyacrylate esters utilized in accordance with the invention and corresponding to the above general formula are exemplified by but not restricted to the following materials: di-, tri-and tetraethylene glycol dimethacrylate, dipropylene glycol dimethacrylate, polyethylene glycol dimethacrylate, di(pentamethylene glycol) dimethacrylate, tetraethylene glycol diacrylate, tetraethylene glycol, di(chloroacrylate), diglycerol diacrylate, diglycerol tetramethacrylate, tetramethylene dimethacrylate, ethylene dimethacrylate, neopentyl glycol diacrylate and trimethylol propane triacrylate. The foregoing monomers need not be in the pure state, but may comprise commercial grades in which stabilizers such as hydroquinones and quinones are included.

A second class of preferred acrylate esters are those which are formed by the reaction of: (a) an acrylate ester containing an active hydrogen atom in the alcoholic portion of the ester; with (b) an organic isocyanate. Preferably, the active hydrogen is the hydrogen of a hydroxy or a primary or secondary amine substituent on the alcoholic portion of the ester, and the isocyanate is a di- or other polyisocyanate. Naturally, an excess of the acrylate ester should be used to insure that each isocyanate functional group in the polyisocyanate is substituted.

The most preferred of the acrylate esters used in the manner described above are those in which the acrylate ester is an alkyl or aryl acrylate ester, most preferably having the formula

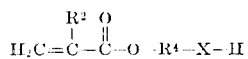

wherein X is selected from the group consisting of —O— and

$R^5$ is selected from the group consisting of hydrogen and alkyl or aralkyl of 1 through about 10 carbon atoms; $R^2$ is as defined above; and $R^4$ is a divalent organic radical selected from the group consisting of alkylene of 1 through about 10 carbon atoms, ether linked polyalkylene of 1 through 12 carbon atoms, and divalent aromatic radicals containing up to about 14 carbon atoms, preferably phenylene, biphenylene and naphthalene.

Typical polyisocyanates which can be reacted with the above acrylate esters to form polyacrylate monomers are toluene diisocyanate, 4,4'-diphenyl diisocyanate, dianisidine diisocyanate, 1,5-naphthalene diisocyanate, trimethylene diisocyanate, cyclohexylene diisocyanate, 2-chloropropane diisocyanate, 4,4'-diphenylmethane diisocyanate, 2,2'-diethyl-ether diisocyanate, 3(dimethylamino) pentane diisocyanate, tetrachlorophenylene diisocyanate-1,4, and trans-vinylene diisocyanate. Still other polyisocyanates that may be used are the higher molecular weight polyisocyanates obtained by reacting an excess of any of the above-described isocyanates with polyamines containing terminal, primary and secondary amine groups, or polyhydric alcohols, for example, the alkane and alkene polyols such as glycerol, 1,2,6-hexanetriol, 1,5-pentanediol, ethylene glycol, polyethylene glycol, bisphenol-A (4,4' - dihydroxydiphenyldimethylmethane), condensation products of alkylene oxides with bisphenol-A, and the like.

Other acceptable monomers which can be used in the adhesives disclosed herein are acrylate terminated epoxy or ester units, or low polymers thereof. Typical exemplary structures which have been prepared embodying these concepts are the following:

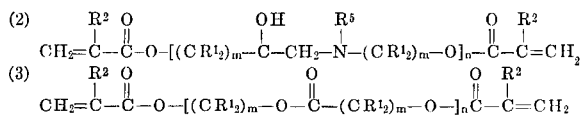

wherein $R^1$, $R^2$, $R^5$, $m$ and $n$ are as defined above.

Naturally any of the above-described acrylate and polyacrylate ester monomers can be used in combination if desired. Many of the higher molecular weight acrylate esters described above are extremely viscous and advantageously are mixed (diluted) with a low viscosity acrylate ester, such as an alkyl acrylate ester.

As used herein, the term "polymerizable acrylate ester monomer" includes not only the foregoing monomers in the pure and impure state, but also those other compositions which contain those monomers in amounts sufficient to impart to the compositions the polymerization characteristics of the acrylate esters. It is also within the scope of the present invention to obtain modified characteristics for the cured composition by the utilization of one or more monomers within the above formula with other unsaturated monomers, such as unsaturated hydrocarbons or unsaturated esters.

The most highly preferred of the peroxy initiators for use in combination with the polymerizable acrylate or polyacrylate esters described above are the organic hydroperoxy initiators, particularly those organic hydroperoxides having the formula $R^6OOH$, wherein $R^6$ is a hydrocarbon radical containing up to about 18 carbon atoms, preferably an alkyl, aryl, or aralkyl radical containing from 1 to about 12 carbon atoms. Typical examples of such hydroperoxides are cumene hydroperoxide, tertiary butyl hydroperoxide, methyl ethyl ketone hydroperoxide, and hydroperoxides formed by the oxygenation of various hydrocarbons, such as methylbutene, cetane, and cyclohexene, and various ketones and ethers, including certain of the compounds represented by general Formula I, above. However, other peroxy initiators can be used, such as hydrogen peroxide, organic peroxides or organic peresters. Those peroxides and peresters which hydrolyze or decompose to form hydroperoxides frequently are highly useful. The hydroperoxy initiators form exceptionally stable anerobic adhesive systems. The combination of acrylate ester monomer and hydroperoxy initiator can be stored for many months without losing effectiveness as an adhesive. Also Belgian Patent 692,031 discloses that peroxides which have a half-life of more than five hours at 100° C. are useful in somewhat related systems. If the peroxy initiator is added near the time of intended use (i.e., anaerobic characteristics are not necessary), substantially all peroxy initiators are useful and, generally, precautions against premature curing are not necessary.

The peroxy initiators which are used commonly comprise less than about 10% by weight of the combination of monomer and initiator since above that level they begin to effect adversely the strength of the adhesive bonds which are formed. Preferably the peroxy initiator comprises from about 0.1% to about 5% by weight of the combination.

When anaerobic adhesives are used, other materials can be added to the mixture of polymerizable acrylate ester monomer and peroxy initiator, such as quinone or polyhydric phenol stabilizers, tertiary amine or imide accelerators, and other functional materials, such as adhesive agents, thickeners, plasticizers, coloring agents, etc. These additives are used to obtain commercially desired characteristics, i.e., suitable viscosity and shelf stability for extended periods (preferably a minimum of six months). The presence of accelerators and stabilizers is particularly important when peroxy initiators other than organic hydroperoxides are used. For a complete discussion of the anaerobic systems and anaerobically curing compositions, reference is made to the following United States patents:

2,895,950 to Vernon K. Krieble, issued July 21, 1959;
3,041,322 to Vernon K. Krieble, issued June 26, 1962;
3,043,820 to Robert H. Krieble, issued July 10, 1962;
3,046,262 to Vernon K. Krieble, issued July 24, 1962;
3,203,941 to Vernon K. Krieble, issued Aug. 31, 1965;
3,218,305 to Vernon K. Krieble, issued Nov. 16, 1965; and
3,300,547 to J. W. Gorman et al., issued Jan. 24, 1967.

The first class of components of the bonding accelerators disclosed herein for use with the above-described acrylate adhesives is the aldehyde-amine condensation products. These products are known accelerators in certain types of reactions and are sold primarily for use in the vulcanization of rubber. A description of these products can be found in the following United States patents: 1,780,334, to Burnett et al., issued Nov. 4, 1930; 1,908,093 to Williams, issued May 9, 1933; and 2,578,690 to Gerhart, issued Dec. 18, 1951. To date, these materials have not been suggested for use as bonding accelerators.

The precise nature of the aldehyde-amine condensation products has never been determined with certainty. Various methods of chemical analysis clearly show the condensation product to be a complex mixture of a large number of compounds, and the bonding acceleration ability of this reaction product, for purposes of this invention, has not been traced to any specific member or members of the mixture. It is highly probable that the various components of the mixture contribute in varying degrees to the total effectiveness of the final product.

Substantial bonding acceleration ability will be obtained from the reaction product regardless of the ratio of aldehyde to amine which is used. However, the most significant bonding acceleration is obtained when the reaction mixture in which the condensation product is produced contains at least one mole of aldehyde for each mole of amine which is used. Preferably, the reaction mixture contains from about 1.0 to about 3.5 moles of aldehyde for each mole of amine which is used and most preferably from about 1.5 to about 3.0 moles of the aldehyde for each mole of the amine. While not necessary to achieve the results of this invention, it has been found that the presence of an acidic material in the condensation reaction mixture tends to accelerate the rate of production of the useful reaction product. Most preferably, the acids are weak organic acids, particularly carboxylic acids such as acetic acid, propionic acid, butyric acid and valeric acid. Low concentrations of inorganic acids, such as phosphoric and sulfuric aids, also can be used. Acetic acid has been found to be the most preferable of the carboxylic acids for the purpose disclosed herein. The speed of production of the suitable reaction product also can be accelerated by the use of appropriate amounts of heat, such as by the use of reaction temperatures of up to about 175° C., but preferably not greater than about 100° C.

The nature of the aldehydes used in the condensation products of the bonding accelerators disclosed herein have not been found to be critical. While some accelerating ability can be obtained by the use of aromatic aldehydes (such as benzaldehyde and naphthaldehyde), the aliphatic aldehydes have been found to be strongly preferable.

For example, aliphatic aldehydes such as formaldehyde, acetaldehyde, propionaldehyde, butyraldehyde, heptaldehyde, hexaldehyde, crotonaldehyde, cinnamic aldehyde, hydrocinnamic aldehyde and 2-phenylpropionaldehyde can be used effectively in preparing the condensation products disclosed herein. For general purposes, the applicable aldehydes can be represented by the formula $R^7CHO$ wherein $R^7$ is a hydrocarbon group containing up to about 12 carbon atoms. Naturally, $R^7$ can contain any substituent or linkage, hydrocarbon or otherwise, which does not affect the condensation product adversely for the purposes disclosed herein.

Similarly, the nature of the primary or secondary amine is not critical for purposes of this invention, i.e., aliphatic or aromatic amines can be used. For example, primary aliphatic amines such as ethyl, n-butyl, n-propyl, isopropyl, n-hexyl and t-butyl amines conveniently can be used. Also primary aromatic amines, such as aniline, p-toluidine, o- or p-naphthalamine, xylidene, benzylamine or p-benzylaniline can be used. While the primary amines are preferred amines for use in preparing the condensation products disclosed herein, aliphatic or aromatic secondary amines also can be used. Typical examples of acceptable secondary amines are diethylamine, dipropylamine, diisopropylamine, diphenylamine, N-phenyl benzylamine and N-allylaniline. For general purposes, the applicable amines can be represented by the formula $R^8R^9NH$, wherein $R^8$ is a hydrocarbon radical containing up to about 14 carbon atoms, and $R^9$ is either hydrogen or $R^8$. Naturally, either $R^8$ or $R^9$ can contain any substituent or linkage, hydrocarbon or otherwise, which does not affect the condensation product adversely for the purpose disclosed herein.

Typical examples of aldehyde-amine condensation products which are useful in the invention disclosed herein are the following: formaldehyde-p-benzyl aniline; acetaldehyde-benzylamine; crotonaldehyde-butylamine; cinnamic aldehyde-aniline; cinnamic aldehyde-butylamine; 2-phenylpropionaldehyde-butylamine; butyraldehyde-butylamine; butyraldehydeaniline; hydrocinnamaldehyde-butylamine; naphthaldehyde-o-toluidine; and heptaldehyde-N-allylaniline.

The reducing activators which are used in combination with the aldehyde-amine condensation products in the bonding accelerators of this invention are free radical accelerators in peroxy-containing redox systems. The two classes of reducing activators which have been found particularly desirable are: (a) sulfur-containing free radical accelerators, and (b) compounds containing an oxidizable transition metal, i.e., the metal moiety of the compound is not in its highest possible oxidation state.

Since the bonding accelerators generally are used in organic solvents for easy application, it is preferable for the sulfur-containing compounds to be organic compounds which are soluble in normal organic solvents. Three classes of sulfur-containing compounds have been found particularly useful as the sulfur-containing free radical accelerators of the compositions disclosed herein, and constitute preferred embodiments of this invention. The three classes are:

(a) Organic thiols, e.g., compounds of the formula $R^{10}SH$. The nature of $R^{10}$ is not critical, but should be of such a nature as to meet the solubility criterion described above. For reasons of availability and usefulness, $R^{10}$ preferably is a hydrocarbon radical containing up to about 10 carbon atoms. Naturally, $R^{10}$ can contain any substituents or linkages, hydrocarbon or otherwise, which do not affect adversely the performance of the thiol for the purposes disclosed herein. Typical examples of suitable thiols are dodecylmercaptan, octylmercaptan, phenylene dimercaptan, dithioacetic acid, thioglycolic acid, thioglycerol and thiobenzyl alcohol;

(b) Organic disulfides, e.g., compounds of the formula $R^{11}$—S—S—$R^{12}$, wherein $R^{11}$ and $R^{12}$ are each the same as $R^{10}$, as defined in (a), above. Typical examples of suitable disulfides are phenyldisulfide, ethyldisulfide, benzothiazyl disulfide, tetramethyl thiuram disulfide and dipentamethylene thiuram disulfide; and (c) The most highly preferred class of the sulfur-containing compounds, organic compounds containing either a

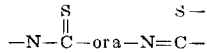

group. The NCS arrangement appears to be the critical factor in compounds of this type, and the nature of the remainder of the molecule is not felt to be determinative of the compound's workability in products and processes of the invention disclosed herein. For example, designating the pertinent compounds by the formulae

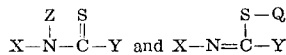

either or both of X and Z can be H or $R^{13}$, wherein $R^{13}$ is an alkyl, cycloalkyl, aryl, aralkyl or other hydrocarbon radical containing up to about ten carbon atoms. Similarly, Y can be H, $R^{13}$, SX, NXZ or N=$R^{13}$, $R^{13}$, Z and X being as defined above. Similarly, Q can be H, $R^{13}$, SX or another

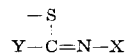

group, all as defined above.

The above-described hydrocarbon groups can contain one or more substituents or linkages, hydrocarbon or otherwise, which do not affect the sulfur-containing compound adversely for the purposes of the invention disclosed herein. For example, the compounds frequently can contain such substituents as hydroxy, halo, thio or amino substituents, and such linkages as ether, thio and imino linkages, without affecting the workability of the sulfur-containing compounds in the bonding accelerators disclosed herein.

Frequently the X and Y substituents are united to form a heterocyclic ring which includes the nitrogen and carbon atoms of the

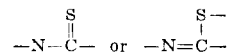

groups, i.e.,

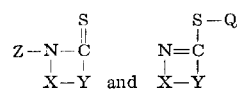

(As used herein, "heterocyclic ring" includes a polynuclear heterocyclic ring system, such as those mentioned hereinafter.) For example, this heterocyclic ring may take the form of a pyrrole, pyrazole, isoazole, oxazole, isoxazine, oxazine or, most preferably, thiazole heterocyclic ring, or of a polynuclear heterocyclic ring system, such as an indole, isobenzazole, isoquinoline, quinoline or, most preferably, benzothiazole polynuclear ring system. Compounds wherein in the X and Y substituents are united in a heterocyclic ring structure are preferred embodiments of this invention. These compounds have been found to have particularly acute accelerating properties when used with the anaerobic adhesives disclosed below.

Typical examples of compounds which fall within the above description of bonding accelerators for use in the invention disclosed herein are the following: thioacetamide, tetramethylthiuram disulfide, thiocarbanilide, copper dimethyldithiocarbamate, thiourea, N,N'-dicyclohexyl thiourea and 1-allyl-2-thiourea. Typical examples of bonding accelerators wherein the X and Y are joined to form a heterocyclic ring, as defined above, are s-triazole-3-thiol, 2-mercapto thiazoline, mercaptobenzothiazole, N-cyclohexylbenzothiazole-2-sulfonamide, N-oxydiethylenebenzothiazole-2-sulfonamide, and 5-amino-2-benzimidazolethiol.

The second class of reducing activators disclosed above is the class of compounds which contains an oxidizable transition metal. The transition metals are those metals which have their valence electrons in a "d" subshell. They comprise Classes IIIb, IVb, Vb, VIb, VIIb, VIIIb and Ib on the periodic chart of the elements. Experience has shown the preferred group of transition metals is that composed of iron, copper, cobalt, nickel and manganese. The presence of the transition metal in the lower oxidation state appears to be the essential characteristic for the purposes of this invention, and the remainder of the compound does not appear to be critical. For example, inorganic compounds containing these transition metals can be used, such as the metal salts which are exemplified by the bromides, chlorides, phosphates, sulfates, sulfides and oxides of the transition metals. However, for the solubility reasons noted previously it is preferable to use organic compounds which contain the transition metal.

A particularly useful class of metal-containing organic compounds has been found to be the organic chelated metal complexes of the above-described transition metals. The organic chelated metal complexes are compounds containing a metal ion which is bound into a ring structure via residual unshared electrons of two or more neighboring atoms. Examples of compounds which commonly are found to form chelated metal complexes are β-diketones and ethylene and propylene diamines. Typical examples of chelated metal complexes which can be used in the bonding accelerators of this invention are iron pentanedione, copper pentanedione, cobalt pentanedione, copper propylene diamine and copper ethylenediamine.

Another class of useful organic compounds are those of the formula $R^{14}OM$, where M is the transition metal and $R^{14}$ is the residue of the organic acid or alcohol $R^{14}OH$. Typical examples of compounds of this type are iron naphthate, nickel naphthate, cobalt naphthanate, manganese naphthanate, copper octoate, iron hexoate, iron propionate and copper hexoate.

In addition, pure organometallics (compounds containing a direct carbon to metal bond) can be used as the reducing activator. However, compounds of this type are not easily produced in lower valence states.

It should be noted that while theory dictates the transition metal be in an oxidizable state, many metal compounds containing metal atoms which appear to be in a fully oxidized state will work acceptably in the bonding accelerators of this invention. While the inventors do not wish to be bound to any particular theory, these results appear to be traceable to, inter alia, the following two possible factors. First, invariably a percentage of the metal compound will be in one or more oxidation states other than the highest one. Secondly, the aldehyde-amine condensation product is a sufficiently active reducing agent that a portion of the metal moiety of many of metal compounds will be reduced to a lower oxidation state upon contact with the aldehyde-amine product. While it is clearly understood that all of such systems are within the broad scope of this invention, the invention herein is expressed in terms of "oxidizable transition metals" since that appears to be the condition which exists at the time of use of the products and processes disclosed herein.

The reason for, and the nature of, the interdependence of the two components of the bonding accelerator system disclosed herein (i.e., the aldehyde-amine condensation product and the reducing activator) is not known with particularity. Test results indicate that while each of the components does produce an accelerating effect on the bonding operation, the aldehyde-amine condensation product appears to be the member of the composition which is primarily responsible for the speed of cure. On the other hand, while the reducing activator does lend some speed of its own, its primary functions appear to be as an activator for the aldehyde-amine and, more important, to transform the bonding accelerator composition into a universal surface activator, that is, one which serves to activate all or nearly all types of surfaces for adhesive bonding.

It is clear that the combination of the two materials, used as a bonding accelerator, produces results which are not achievable by either of the components alone at a comparable use level and, in fact, bonding capabilities are obtained with acrylate adhesives which have not been achievable previously with any known combination of ingredients.

The levels of use of the two different classes of active ingredients of the bonding accelerators disclosed herein can vary within wide ranges without deviating from the broad scope of this invention. Some accelerating ability will be produced by any combination of members of the two classes of materials. The optimum level for use for any specific combination of the compounds easily can be determined with a minimum of routine testing. While the optimum ratio of aldehyde-amine condensation product to reducing activator will vary from one system to the next, the following guidelines can be used since they do define the ranges of preferred use of the various components. Little if any additional benefit is achieved in any bonding accelerator composition described herein when the ratio of aldehyde-amine condensation product to reducing activator is less than about 1:2. Likewise, little if any additional benefit is achieved when the ratio of aldehyde-amine condensation product to reducing activator is greater than about 20:1. More specifically, when a sulfur containing compound as described above is used as the reducing activator, the most highly preferred ratio of aldehyde-amine condensation product to sulfur-containing compound is from about 1:1.5 to about 4:1. When a transition metal compound as described above is used in combination with the aldehyde-amine condensation product, the most highly preferred ratio of aldehyde-amine condensation product to transition metal compound is from about 1:1 to about 15:1.

In order to obtain the maximum benefits of the bonding systems disclosed herein, it is important that the bonding accelerator composition be able to intimately contact the acrylate adhesive. While this can be accomplished in a number of ways, it has been found preferable to dissolve or disperse the bonding accelerator in a volatile solvent. The solution or dispersion of bonding accelerator in the solvent then can be applied to at least one of the surfaces to be bonded, and the solvent allowed to evaporate leaving a deposit of bonding accelerator on the surface or surfaces. Because of the extremely rapid cure speed, it is preferable to apply the bonding accelerator to each of the surfaces which are to be bonded. In this manner a more uniform polymerization pattern is produced, stresses in the bond are minimized, and stronger bonds are produced. The adhesive then can be applied directly to at least one of the surfaces to be bonded. If bonding accelerator has been applied to only one surface, it is not material whether the adhesive and the bonding accelerator are applied to the same or different surfaces. The surfaces so treated then are placed or clamped together and the adhesive allowed to cure.

In choosing the solvent for dissolution or dispersion of the bonding accelerator, a solvent with a rapid rate of evaporation is desirable. This reduces the possibility of trapping solvent in the bonding accelerator-adhesive system during the bonding operation (which may tend to weaken the bond), and also avoids unnecessary delays to allow the solvent to evaporate before completing the bonding operation. While a large number of solvents are available for this purpose, the ones which have been found most useful are halogenated hydrocarbons, particularly chlorinated and/or fluorinated hydrocarbons, such as methylene chloride, trichloroethane, methylchloroform and trichloromonofluoromethane, and lacquer type solvents, such as acetone, methyl ethyl ketone, methyl isobutyl ketone, and ethyl acetate. Other acceptable solvents are xylene, benzene and toluene. Nearly all of these solvents, and particularly the halogenated hydrocarbons, produce a secondary benefit in that they can serve to clean the area of the surface which is to be bonded, thus reducing the chance of weak bond formation.

Frequently a small amount of a second, or "mutual," solvent can be added to the system in order to aid in solubilizing or dispersing the bonding accelerator. (Certain of the bonding accelerators disclosed herein are not excessively soluble in a number of the "primary" solvents disclosed above). Since nearly all of the bonding accelerators disclosed herein are soluble in alcoholic type solvents, such as ethyl alcohol, methyl alcohol, butyl alcohol and isopropyl alcohol, these have been found particularly adaptable to use as mutual solvents. Since many of these mutual solvents do not vaporize with the rapidity of the primary solvents, they should be used in as small an amount as possible, consistent with dissolving or dispersing the bonding accelerator. Preferably, the amount of mutual solvent should not exceed 15% by weight of the total amount of solvent in the system.

The amount of the bonding accelerator composition used in the solvent is limited only by its solubility characteristics in the solvent chosen. However, it is desirable to use a concentration which will produce optimum results during normal usage. If too little accelerator is applied, maximum speed of cure will not be achieved. If excessive accelerator is applied, the accelerator can form a barrier to effective contact between the adhesive and the surface to be bonded, thus reducing the ultimate strength of the bond which is formed. Based on the method of common usage of such products, it has been found preferable to use an accelerator concentration in the solvent of between about 0.1% and about 10% by weight.

The most highly preferred method of applying the bonding accelerator to the surface is from an aerosol container. In this manner a thin uniform film of the bonding accelerator is easily applied to the surface, and the maximum rate of solvent vaporization is achieved. Furthermore, more highly volatile solvents can be used under aerosol conditions than can be used conveniently in standard atmospheric pressure containers. Typical solvents within this category are dichlorodifluoromethane, vinyl chloride, and monochlorodifluoromethane. Upon release from the aerosol container, these solvents will evaporate exceedingly rapidly and thus shorten the time period between application of the bonding accelerator and completion of the bonding operation.

The amount of bonding accelerator to be applied to a given surface should be no more than necessary to obtain efficient acceleration of the bonding operation. Excess accelerator on one or more of the bonded surfaces can affect adversely the strength of the final bond. Further, when the amount of bonding accelerator exceeds about 5% by weight of the adhesive used, little if any additional increase in speed is noted. Generally, an amount of bonding accelerator equal to from about 0.05% to about 1.0% by weight of the adhesive is adequate. While it is not easy to determine the amount of accelerator applied to a given surface, adequate results are obtained with the single application by aerosol or otherwise of a thin film of the accelerator dissolved or dispersed in an appropriate solvent to one of the surfaces to be bonded.

When the bonding accelerator has been applied to the surface and the solvent, if any, has been allowed to evaporate, the bonding operation can proceed in the normal manner. The adhesive can be applied either to the surface which has been treated with the bonding accelerator or to the appropriate mating surface. Customarily, as with most bonding operations, a thin film of adhesive is most desirable. The two mating surfaces are then placed in abutting relationship, and, preferably, a moderate compressive force is applied to produce a relatively thin layer of adhesive between the two surfaces, spread the adhesive evenly between the surfaces, and thus maximize the bonding efficiency. Typically a thickness of adhesive between the surfaces of from about .001 inch to about .005 inch is desirable. Such thicknesses generally can be achieved with the adhesives disclosed herein by the application of a moderate compressive force, such as of from about 5 to about 50 pounds per square inch.

EXAMPLES

The following examples are given to demonstrate typical products and processes within the scope of the invention disclosed herein, and are not intended to be limitations upon the invention. Unless stated to the contrary, all ratios and percentages in the examples are on a weight basis.

Example I

A polymerizable acrylate sealant was prepared by mixing 98% by weight polyethyleneglycol dimethacrylate dimethacrylate (average molecular weight=330) with approximately 2% by weight cumene hydroperoxide. This sealant then was used to test various bonding accelerators.

A series of eleven bonding accelerators was prepared by dissolving one or more active ingredients in benzene. The active ingredients are listed below in Table I. It is apparent that single activators were used in Samples 1 through 5 inclusive, and that two of the activators of Samples 1 through 5 were used in various combinations to prepare Samples 6 through 11, inclusive (which are bonding accelerators within the scope of the invention disclosed herein).

Each of bonding accelerators 1 through 11 then was applied to (a) a series of standard ⅜-inch steel bolts, and (b) a series of standard ⅜-inch cadmium plated bolts. Application was by dipping the bolt into a beaker of the bonding accelerator, following which about 30 seconds was allowed to permit the benzene to evaporate. Several drops of the sealant then were applied to the threaded portion of the bolt, and the bolt immediately was assembled with a mating nut, leaving about three threads exposed below the nut. The nut then was moved slightly every few seconds, and the time recorded when such movement was not possible by hand. This time is defined as "fixture time."

The specific active ingredients chosen and the amounts of each used in preparing the various bonding accelerators, and the results produced with each such bonding accelerator are recorded in Table I, below. The butyraldehyde-aniline condensation product was that sold by the DuPont Co. under the name "808." The butyraldehyde-butyl amine was that sold by the Du Pont Co. under the name "833." The hydrocinnamic aldehyde-butyl amine was prepared by reacting a 1:1 mole ratio of the aldehyde and amine for three hours at 50° C. in a methylene chloride solvent. The weight percent figures for the active ingredients are based upon the total weight of the bonding accelerator composition, including the benzene solvent. All figures for fixture times are the average of three tests.

TABLE I

| | Condensation product weight, percent | Reducing activator weight, percent | Fixture time — Steel nuts and bolts, minutes | Fixture time — Cadmium plated nuts and bolts, minutes |
|---|---|---|---|---|
| Sample Number: | | | | |
| Control | None | None | (1) | (2) |
| 1 | Butyraldehydeaniline, 6% | do | 25 | 240 |
| 2 | Butyraldehyde-butylamine, 6% | do | 18 | 240 |
| 3 | Hydrocinnamic aldehyde-butylamine, 6% | do | 20 | (2) |
| 4 | None | 2-mercaptobenzothiazole, 2% | 4 | 180 |
| 5 | do | Copper pentane-dione, 0.2% | (1) | 360 |
| 6 | See sample Number 1 | See sample Number 4 | 2 | 3 |
| 7 | See sample Number 2 | do | 1.5 | 4 |
| 8 | See sample Number 3 | do | 2 | 2 |
| 9 | See sample Number 1 | See sample Number 5 | 2.5 | 4.5 |
| 10 | See sample Number 2 | do | 2.5 | 2 |
| 11 | See sample Number 3 | do | 1.5 | 7 |

1 >6 hours.
2 >20 hours.

Example II

The tests of Example I were repeated using the identical materials and amounts thereof, except that 2-hydroxypropyl methacrylate was substituted for the polyethyleneglycol dimethacrylate in preparing the polymerizable acrylate sealant. The results of the tests are presented below in Table II, each fixture time figure being an average of three tests. The bonding accelerators of Table II are designated by the same sample numbers as appear in Table I, above.

TABLE II

| | Fixture time— | |
|---|---|---|
| | Steel nuts and bolts, minutes | Cadmium plated nuts and bolts, minutes |
| Sample Number: | | |
| Control | (1) | (2) |
| 1 | 25 | 45 |
| 2 | 20 | 15 |
| 3 | 20 | 30 |
| 4 | 10 | 30 |
| 5 | (2) | 30 |
| 6 | 2 | 5 |
| 7 | 2 | 5 |
| 8 | 2 | 5 |
| 9 | 2 | 2 |
| 10 | 2.5 | 2 |
| 11 | 2 | 3 |

[1] >20 hours.
[2] >6 hours.

Example III

A polymerizable acrylate adhesive formulation was prepared by mixing the following ingredients in the approximate proportion indicated.

Component: Weight (percent)

Adhesive monomer 1 [1] _____ 36
   Adhesive monomer 2 [2] _____ 6
   Hydroxypropyl methacrylate _____ 48
   Adhesive agent _____ 7
   Cumene hydroperoxide _____ 3
   Quinone—100 parts per million by weight.

Total _____ 100

[1] Reaction product of two moles β-hydroxypropyl methacrylate with one mole of the reaction product of one mole of hydrogenated "Bisphenol–A" (4,4′-dicyclohexanol dimethylmethane) and two moles of toluene diisocyanate.
[2] Reaction product of three moles of hydroxyethyl methacrylate with one mole of the reaction product of polypropylene-triol (average molecular weight=2,500) and three moles of toluene diisocyanate.

The adhesive so prepared was used to bond a series of one-inch by five-inch by 1/16-inch steel lap strips, using the bonding accelerators of Example I to increase the speed of cure of the adhesive. The bonding accelerator was applied with a cotton swab to at least one-inch of the flat surface at the end of each of two lap strips. A thin coating of the adhesive then was applied to one of the treated surfaces, and the treated surface of the second lap strip immediately was placed on top of the adhesive. The lap strips were positioned in an aligned relationship and the overlap of the two strips was adjutsed to one inch. Pressure was applied perpendicular to the treated surfaces to reduce the bond line to approximately 0.001 to 0.003 inch.

In view of the extreme accelerating ability of the bonding accelerators of this invention, the above operations were performed as rapidly as possible.

To measure the accelerating ability of the various bonding accelerators used, the "fixture time" was determined. "Fixture time" is the earliest time at which the bonded assembly can be held at one end and gently shaken without producing relative movement between the two lap strips. In addition, the "two minutes shear strength" of the bond was determined, i.e., the shear force necessary to separate the lap strips approximately two minutes after application of the adhesive. The determination was made on standard laboratory tensile tester (Research Products Co. Model RPC).

In addition to the tests involving the steel lap strips described above, the "fixture time" for the adhesive and the same bonding accelerators was determined using one-inch by three-inch by 1/16-inch glass slides. The results of the above three tests are recorded below in Table III, all figures being the average of three tests. The bonding accelerators of Table III are designated by the same simple numbers as appear in Table I, above.

TABLE III

| | Fixture time, steel lap strips, seconds | Two minute shear strength, steel lap strips, p.s.i. | Fixture time, glass slides, seconds |
|---|---|---|---|
| Sample Number: | | | |
| Control | (1) | 0 | (1) |
| 1 | 15 | 1,380 | 45 |
| 2 | 10 | 2,260 | 20 |
| 3 | 30 | 1,620 | 120 |
| 4 | 60 | 660 | 420 |
| 5 | (1) | 0 | (1) |
| 6 | 17 | 1,840 | 30 |
| 7 | 15 | 1,320 | 10 |
| 8 | 20 | 1,280 | 45 |
| 9 | 10 | 2,080 | 10 |
| 10 | 5 | 2,760 | 4 |
| 11 | 15 | 2,480 | 17 |

[1] >6 hours.

Example IV

The butyraldehyde-butylamine condensation product of Example I, above, was used in combination with various reducing activators to form bonding accelerators within the scope of the invention disclosed herein. These bonding accelerators then were used in conjunction with the sealant of Example I and the adhesive of Example III. Using the sealant and test procedures of Example I, the fixture times on standard 3/8-inch steel nuts and bolts and on standard 3/8-inch cadmium plated nuts and bolts were determined. The fixture times and two-minute shear strengths on one-inch by five-inch by 1/16-inch steel lap strips, and the fixture time on one-inch by three-inch by 1/16-inch glass slides were determined using the adhesive and test procedures of Example III. The specific reducing activators used in combination with the butyraldehyde-butylamine condensation product, and the corresponding fixture times are tabulated in Table IV. Benzene was used as the solvent for each bonding accelerator, and the concentration of condensation in the the benzene was 6% by weight of the bonding accelerator composition; the corresponding concentration of the reducing activator is included in Table IV. All test result figures are an average of three tests.

TABLE IV

| Sample Number: | Reducing activator | Weight (percent) reducing activator | Fixture time— Steel nuts and bolts, minutes | Fixture time— Cadmium, plated nuts minutes | Steel lap strips, seconds | Two-minute shear, steel lap strips, p.s.i. | Fixture time, glass slides, seconds |
|---|---|---|---|---|---|---|---|
| Control | None | | (1) | (2) | (1) | 0 | (1) |
| 12 | 1-allyl-2-thiourea | 2.0 | 5 | 7 | 10 | 1,120 | 20 |
| 13 | Copper dimethyl dithiocarbamate | 0.2 | 5 | 5 | 5 | 2,840 | 7 |
| 14 | Cobalt pentanedione | 0.2 | 15 | 15 | 7 | 3,360 | 25 |
| 15 | Iron pentanedione | 0.2 | 9.5 | 13 | 2 | 3 560 | 2 |
| 16 | Cobalt naphthanate | 0.2 | 7 | 5 | 15 | 2,960 | 20 |
| 17 | Copper naphthanate | 0.2 | 1 | 1 | 2 | 3 720 | 2 |
| 18 | Iron naphthanate | 0.2 | 15 | 32 | 2 | 3 880 | 3 |
| 19 | Dodecylmercaptan | 2.0 | 20 | 60 | 7 | 2,440 | 10 |
| 20 | Thiocarbanilide | 2.0 | 30 | 60 | 10 | 2,600 | 15 |
| 21 | N-oxydiethylene benzothiazole-2-sulfenamide | 2.0 | 2 | 8 | 5 | 2,480 | 5 |

1 >6 hours.
2 >20 hours.
3 Examination of the samples after testing clearly indicated the speed of cure had been too rapid to permit development of strong bonds. The adhesive had cured before the bond line could be reduced to about 0.005" or less, which is unfavorable for effective bond formation. However, these tests do serve as dramatic proof of the effectiveness of the bonding accelerators.

When in the above example, the butyraldehyde-butylamine condensation product in any of Samples 12 through 21 is replaced in whole or in part by any of the following aldehyde amine condensation products: formaldehyde-p-benzyl aniline; acetaldehyde-benzylamine; crotonaldehyde-butylamine; cinnamic aldehyde-aniline; cinnamic aldehyde - butylamine; 2 - phenylpropionaldehyde-butylamine; butyraldehyde-butylamine; butyraldehyde-aniline; hydrocinnamic aldehyde-butylamine; or heptaldehyde-N-allyl aniline; substantially similar results are obtained in that extremely rapid bonding of the various parts is produced.

Example V

A series of sealant compositions were prepared using the polyethyleneglycol dimethacrylate of Example I and various peroxy initiators. These sealants then were used in combination with the bonding accelerator designated "Sample Number 10" in Example I, above, to determine the fixture time on both steel and cadmium plated ⅜-inch nuts and bolts. In each instance the test procedures were as described in Example I, and the sealant was composed of 98% by weight polyethyleneglycol dimethacrylate and 2% by weight of the peroxy initiator indicated below in Table V.

The results are tabulated in Table V, all figures being the average of three tests. The tests marked "Control" were identical tests run on steel nuts and bolts which had not been treated with a bonding accelerator.

TABLE V

| Sample: | Peroxy initiator | Fixture time Steel nuts and bolts, minutes | Fixture time Cadmium plated nuts and bolts, minutes | Control, hours |
|---|---|---|---|---|
| A | Tertiary butyl perbenzoate | 3 | 25 | >24 |
| B | Tertiary butyl isopropylpercarbonate | 6 | 6 | >24 |
| C | Lauroyl peroxide | 1 <10 | 1 <10 | >24 |

1 Seconds.

When in the above example, in any of Samples A, B and C, the indicated peroxy initiator is replaced by azobis-isobutyronitrite (a non-peroxy polymerization initiator), no "fixturing" is observed within 24 hours.

Example VI

The tests of Example I were repeated for all bonding accelerators identified in Example I by Sample Numbers 1 through 11 inclusive, except that the polyethyleneglycol dimethacrylate was replaced by a comparable amount of divinylbenzene, a free radical polymerizable monomer of the non-acrylate type. In each instance, no fixturing was observed within six hours. Comparable results were obtained when the divinylbenzene was replaced by a comparable amount of: (a) acrylonitrile; (b) 2-chloroethyl vinyl ether; and (c) diallylmaleate. Each of (a), (b) and (c) are polymerizable monomers of the non-acrylate type.

We claim:
1. A primer for activating surfaces for adhesive bonding comprising a mixture of (1) a condensation reaction product of an aldehyde and a primary or secondary amine; and (2) a reducing activator selected from the group consisting of sulfur-containing free radical accelerorganic disulfides and organic compounds containing either a

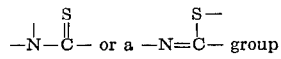

and compounds containing an oxidizable transition metal.

2. A multipart adhesive system which comprises: (A) as a polymerizable adhesive composition, a mixture of a polymerizable acrylate ester monomer and a peroxy polymerization initiator; and (B) as a bonding accelerator, a mixture comprising (1) a condensation reaction product of an aldehyde and a primary or secondary amine; and (2) a reducing activator selected from the group consisting of (a) a sulfur-containing free radical accelerator selected from the group consisting of organic thiols, organic disulfides and organic compounds containing either a

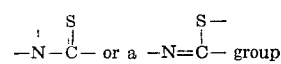

and (b) a compound containing an oxidizable transition metal.

3. The adhesive of claim 2 wherein the condensation reaction product is the condensation reaction product of (i) an aldehyde having the formula RCHO wherein R is a hydrocarbon group containing up to about 12 carbon atoms, and (ii) an amine having the formula R′R″NH wherein R′ is a hydrocarbon group containing up to about 14 carbon atoms and R″ is hydrogen or R′.

4. The adhesive system of claim 3 wherein the aldehyde is an aliphatic aldehyde, and R″ is hydrogen.

5. The adhesive system of claim 2 wherein the reducing activator is an organic compound containing either a

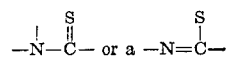

group wherein the nitrogen and carbon atoms are part of a heterocyclic ring.

6. The adhesive system of claim 5 wherein the reducing activator is mercaptobenzothiazole.

7. The adhesive system of claim 2 wherein the reducing activator is a compound containing an oxidizable transition metal selected from the group consisting of iron, copper, cobalt, nickel and manganese transition metals.

8. The adhesive system of claim 7 wherein the reducing activator is an organic chelated metal complex.

9. The adhesive system of claim 7 wherein the reducing activator has the formula R′″OM wherein M is the transition metal and R''' is the residue of an organic acid or alcohol of the formula R'''OH.

10. The adhesive system of claim 2 wherein the weight ratio of condensation reaction product to reducing activator is from about 1:2 to about 20:1.

11. The adhesive system of claim 2 wherein the polymerizable acrylate ester monomer has the formula

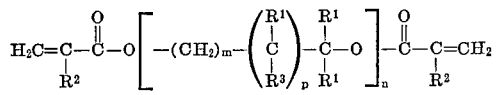

wherein R¹ represents a radical selected from the group consisting of hydrogen, lower alkyl of from 1 to about 4 carbon atoms, hydroxy alkyl of from 1 to about 4 carbon atoms, and

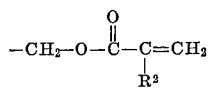

R² is a radical selected from the group consisting of hydrogen, halogen, and lower alkyl of from 1 to about 4 carbon atoms; R³ is a radical selected from the group consisting of hydrogen, hydroxyl, and

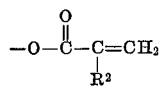

$m$ is an integer equal to at least 1, e.g., from 1 to about 15 or higher, and preferably from 1 to about 8 inclusive; $n$ is an integer equal to at least 1, e.g., 1 to about 20 or more; and $p$ is one of the following: 0, 1.

12. The adhesive system of claim 2 wherein the polyacrylate ester monomer is the reaction product of (i) an acrylate ester having an active hydrogen in the alcoholic portion thereof and (ii) a polyisocyanate.

13. The adhesive system of claim 2 wherein the peroxy polymerization initiator is a hydroperoxy polymerization initiator.

14. The adhesive system of claim 11 wherein the acrylate ester monomer is a polyethyleneglycol dimethacrylate, and the peroxy polymerization initiator is a hydroperoxy polymerization initiator.

15. A process for bonding surfaces which comprises: (A) applying to at least one of such surfaces a bonding accelerator containing a mixture of (1) a condensation reaction product of an aldehyde and a primary or secondary amine; and (2) as a reducing activator, (a) a sulfur-containing free radical accelerator selected from the group consisting of organic thiols, organic disulfides and organic compounds containing either a

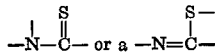

group, or (b) a compound containing an oxidizable transition metal; (B) applying to at least one of such surfaces an adhesive composition comprising a mixture of a polymerizable acrylate ester monomer and a peroxy polymerization initiator; and (C) placing the surfaces so treated in abutting relation until the adhesive composition polymerizes and bonds the surfaces together.

16. The process of claim 15 wherein the bonding accelerator is dissolved in a volatile organic solvent.

17. The process of claim 16 wherein the bonding accelerator and volatile organic solvent are applied from an aerosol container.

18. The process of claim 15 wherein the polymerizable acrylate ester monomer is a polyethyleneglycol dimethacrylate, and the peroxy polymerization initiator is a hydroperoxy polymerization initiator.

19. The process of claim 15 wherein the polymerizable acrylate ester is the reaction product of (i) an acrylate ester having an active hydrogen in the alcoholic portion of the ester and (ii) an organic polyisocyanate, and the polymerization initiator is an organic hydroperoxide.

20. The process of claim 15 wherein the condensation reaction product is the condensation reaction product of (i) an aldehyde having the formula RCHO wherein R is a hydrocarbon group containing up to about 12 carbon atoms, and (ii) an amine having the formula R'R''NH wherein R' is a hydrocarbon group containing up to about 14 carbon atoms and R'' is hydrogen or R'.

21. The process of claim 20 wherein the reducing activator is a compound containing an oxidizable transition metal selected from the group consisting of iron, copper, cobalt, nickel and manganese transition metals.

22. The process of claim 15 wherein the weight ratio of condensation reaction product to reducing activator is from about 1:2 to about 20:1.

References Cited

UNITED STATES PATENTS

| | | | |
|---|---|---|---|
| 3,125,480 | 3/1964 | Karo et al. | 156—310 |
| 3,166,539 | 1/1965 | Schuchardt | 260—89.5 |
| 3,203,941 | 8/1965 | Krieble | 260—85.7 |
| 3,207,815 | 9/1965 | Joo et al. | 260—862 |
| 3,275,611 | 9/1966 | Mottus | 260—89.5 |
| 3,454,538 | 7/1969 | Naarmann et al. | 260—89.5 |
| 3,476,723 | 11/1969 | Stahl et al. | 260—89.5 |

JOHN T. GOOLKASIAN, Primary Examiner

D. J. FRITSCH, Assistant Examiner

U.S. Cl. X.R.

156—314, 316, 332; 252—188, 188.3; 260—885, 72, 72.5, 86.1, 89.5